United States Patent [19]
Fletcher et al.

[11] B 3,984,799

[45] Oct. 5, 1976

[54] DC-TO-DC CONVERTERS EMPLOYING STAGGERED-PHASE POWER SWITCHES WITH TWO-LOOP CONTROL

[76] Inventors: James C. Fletcher, Administrator of the National Aeronautics and Space Administration, with respect to an invention of Gene W. Wester, Pasadena, Calif.

[22] Filed: Dec. 17, 1974

[21] Appl. No.: 533,734

[44] Published under the second Trial Voluntary Protest Program on January 27, 1976 as document No. B 533,734.

[52] U.S. Cl. .................................. 321/2; 321/19; 323/17; 323/22 T; 323/23; 323/DIG. 1
[51] Int. Cl.² .................... H02M 3/335; G05F 1/64
[58] Field of Search ............... 307/296, 297; 321/2, 321/18, 19, 20; 323/6, 17, 22 T, 23, 25, 28, DIG. 1

[56] References Cited
UNITED STATES PATENTS

| | | |
|---|---|---|
| 3,521,150 | 7/1970 | Bates .............................. 323/25 X |
| 3,571,697 | 3/1971 | Phillips ............................ 323/17 |
| 3,619,758 | 11/1971 | Deranian ........................... 321/2 |
| 3,621,371 | 11/1971 | Brumm ............................. 323/17 |
| 3,736,496 | 5/1973 | Lachocki ........................ 323/25 X |

*Primary Examiner*—A. D. Pellinen
*Attorney, Agent, or Firm*—Monte F. Mott; Paul F. McCaul; John R. Manning

[57] ABSTRACT

Boost, buck and buck-boost dc-to-dc converters employing a plurality of parallel staggered-phase power switches with two-loop control. A switched inductor voltage is coupled to a sense winding in each phase, and all sense windings are connected in series to one of two feedback loops to provide a signal that indicates when one of the power switches is on as the principal determinant of switching instants. A sequencer is triggered each time a pulse generator is triggered to turn on a different power switch in sequence at each switching instant.

10 Claims, 5 Drawing Figures

DC-TO-DC CONVERTERS EMPLOYING STAGGERED-PHASE POWER SWITCHES WITH TWO-LOOP CONTROL

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates to dc-to-dc converters, and more particularly to multiphase converters with two-loop feedback control.

In a single-phase dc-to-dc converter, a signal $x$ which indicates the state of the single power switch is the principal determinant of switching instants for two-loop feedback control. One feedback loop is for that pulsed signal and the other is for the output voltage $e_o$. The two are added, compared with a reference and the difference, a pulsed error signal X, is applied to an integrator where the rectangular pulse waveform is converted to a sawtooth waveform. A comparator or threshold detector determines when the sawtooth waveform attains a predetermined (zero or non-zero) level. Each time that level is reached, a pulse generator is triggered to turn the power switch on for a fixed time, T. If the output voltage $e_o$ increases, the minimum level is reached later, thus delaying the time for the power switch to be turned on again. Conversely, if the output voltage $e_o$ decreases the minimum level is reached earlier, thus advancing the time for the power switch to be turned on again. The pulsed power delivered by the switch is filtered to provide the dc output voltage $e_o$.

Since all of the power delivered to the load must be provided through the single power switch, a dc-to-dc converter with two-loop control is limited in load capacity. For greater load capacity, it would be desirable to provide additional power switches in parallel, but the problem would then be to design a circuit that assures equal division of the load. That problem can be avoided by operating the power switches in phase-staggered sequence, but since one of the two feedback loops indicates the state of the power switch as the principal determinant of switching instants, two-loop control of N phase-staggered power switches implicitly requires 2N feedback loops, two loops for each of the N power switches, and a synchronizing circuit to maintain proper phase relationship. Consequently, a multiphase dc-to-dc converter with two-loop control would, but for the present invention, entail greatly increased complexity and component count.

OBJECTS AND SUMMARY OF THE INVENTION

An object of this invention is to provide for N phase staggered power switches in a dc-to-dc converter with two-loop control using only two feedback loops, one to indicate the state of the power switches for use as the principal determinant of switching instants in the dc-to-dc converter control and the other for regulation of the output voltage to a load.

Another object of this invention is to provide multiphase control without the need for a separate synchronizing circuit.

These and other objects of the invention are achieved by providing a plurality of power switches connected in between a voltage source and a load, each power switch including an inductor through which current flows to the load on a switched basis and a sense winding inductively coupled to the inductor to produce a pulse in one feedback loop indicating the state of the power switch. All of the sense windings of the power switches are connected in series with the same polarity to the one feedback loop. A low-pass filter smooths the current from the inductor to provide a dc output voltage to the load. That dc output voltage is sampled in a second feedback loop for comparison with a reference, and the difference is added to the signal in the first feedback loop to produce a pulsed error signal. Each pulse of the pulsed error signal is integrated to produce a sawtooth waveform. Each time the sawtooth waveform returns to a zero or non zero reference as determined by a comparator, a pulse generator is triggered to produce a pulse to turn a power switch on through an associated one of a plurality of gates, one gate for each power switch. At the same time a sequencer is triggered by the output of the comparator so that at each switching instant, a different one of the power switches is turned on in sequence. The power switches may each be configured for boost regulation, buck regulation or buck-boost regulation of the output voltage.

DESCRIPTION OF THE PREFERRED EMBODIMENTS

Figure 1:
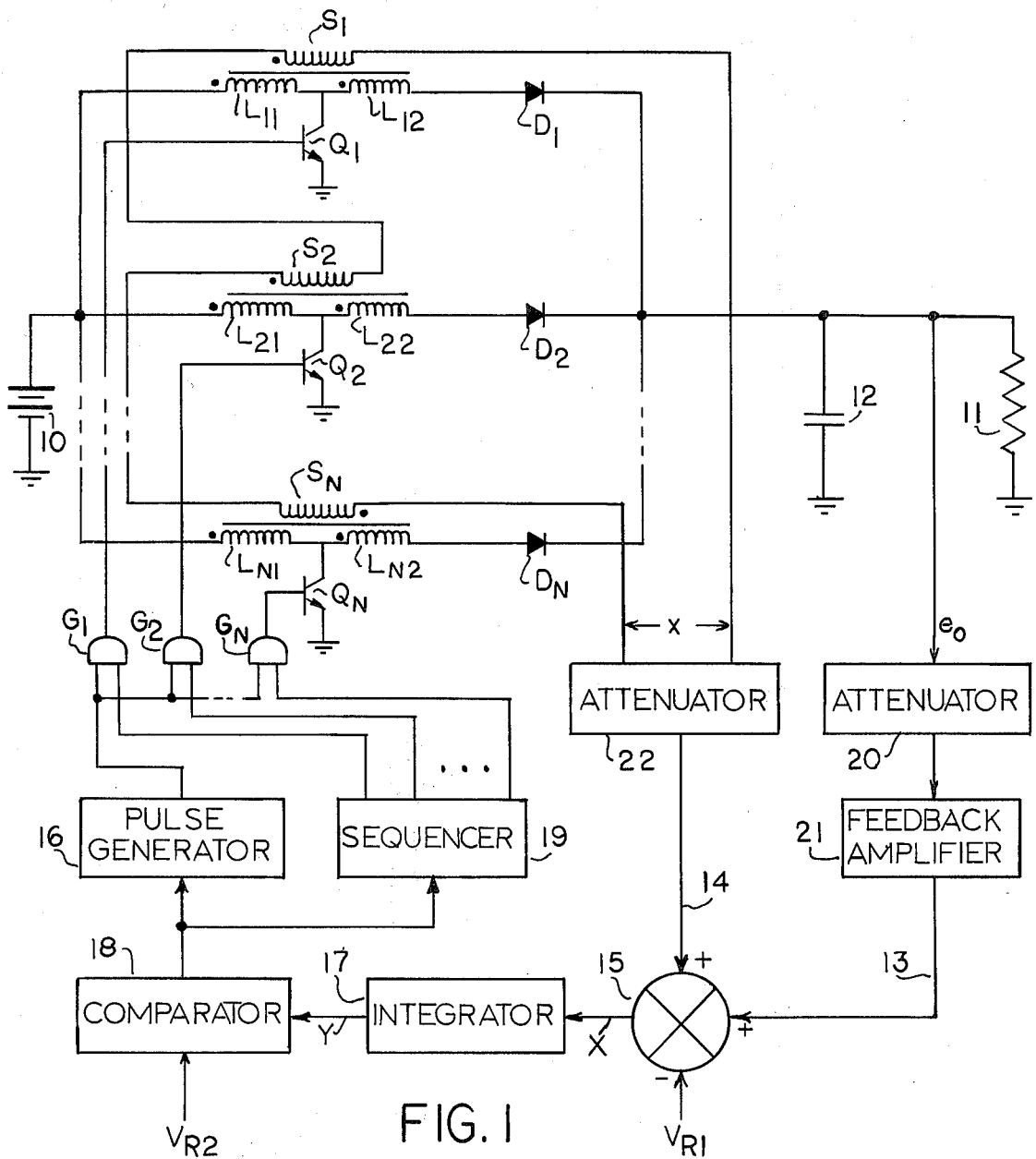
FIG. 1 is a schematic diagram of the present invention employing a boost regulator.

Referring to FIG. 1, a staggered multiphase boost regulator with two-loop control is provided in accordance with the present invention by connecting pulse feedback winding $S_1, S_2 \ldots S_N$ in series. Each phase is implemented with a power switch that couples a dc voltage source 10 to a load 11 through an isolating or buffer diode for a fixed time T. The current pulses thus produced and combined through diodes $D_1, D_2 \ldots D_N$ are filtered by a low-pass filter capacitor 12 to provide a dc output voltage $e_o$.

Figure 2:
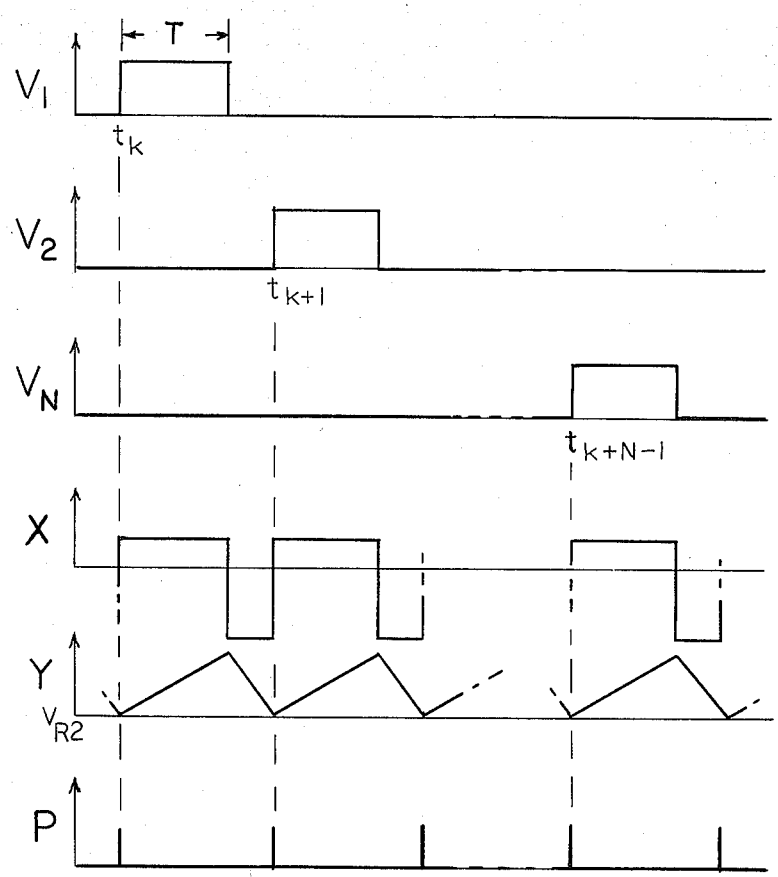
FIG. 2 is a timing diagram illustrating waveforms of signals at specified points in the two feedback loops of the regulator of FIG. 1.

Two feedback loops 13 and 14 are combined by a summing circuit 15 to apply a feedback signal to a pulse generator 16 through an integrator 17 and comparator 18. Output pulses from the pulse generator are continually distributed to power switch transistors $Q_1, Q_2 \ldots Q_N$ through gates $G_1, G_2 \ldots G_N$ by a sequencer 19, such as a conventional ring counter in which the on state is continually transferred from one stage in a ring to another. The distributed pulses are shown in waveforms $V_1, V_2 \ldots V_N$ in the timing diagram of FIG. 2.

As power switch transistor $Q_i$ (where $i$ is the number 1, 2 . . . N corresponding to a particular phase) is turned on, the junction between series connected primary and secondary windings $L_{i1}$ and $L_{i2}$, respectively, is coupled to ground, thus causing the dotted ends of primary, secondary and sense windings to be positive with respect to the undotted ends. Consequently, diode $D_i$ is reverse biased and no secondary current flows. However, the voltage polarity at each winding reverses as $Q_i$ is turned off, which allows a current pulse to flow into the filter capacitor 12.

The pulse width (T) is set by the pulse generator 16, and in this exemplary embodiment it may be implemented as simply a fixed monostable multivibrator. The time from one output pulse produced by the pulse generator to the next is determined by the pulsed feedback signal integrated and then applied to the comparator in a conventional manner for a single-phase, two-loop boost regulator. However, it should be noted that the pulse width may be controlled as a function of the feedback signal in addition to or in lieu of controlling frequency. It is only for simplicity that a fixed pulse width is assumed in this embodiment of the invention.

The output voltage to the load is coupled to the summing circuit through an attenuator 20 to provide a signal $v_o$ in the first feedback loop. A feedback amplifier 21 may be included between the attenuator 20 and summing circuit to adjust the base level of the pulsed error signal out of the summing circuit.

A second feedback signal x comprised of pulses induced in the series connected sense windings on each of the power switch transformers is connected to the summing circuit through an attenuator 22 in the second feedback loop. The sum of the feedback signal $A_x x$, where $A_x$ is the gain factor of the attenuator 22, and the difference $A_o e_o - V_{R1}$ (the difference between the feedback signal $A_o e_o$ and a reference $V_{R1}$), where $A_o$ is the combined gain factor of the attenuator 20 and feedback amplifier 21, is shown as the waveform X in the timing diagram of FIG. 2. The output of the integrator is shown by the waveform Y in FIG. 2. Each time the signal Y reaches a reference level $V_{R2}$, as determined by the comparator 18, a pulse is transmitted to the pulse generator 16 as shown in the waveform P.

Figure 3:
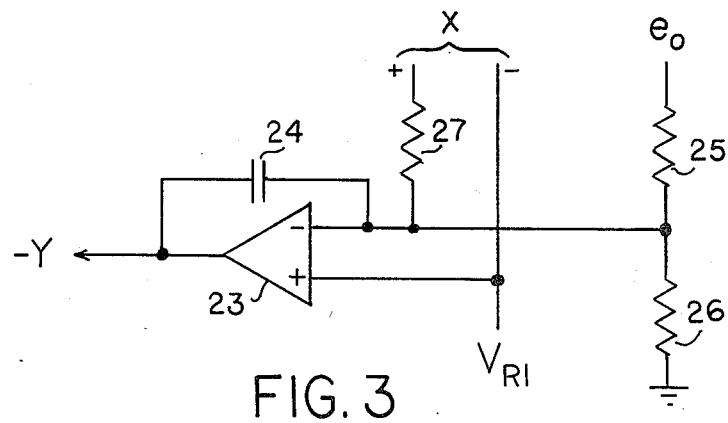
FIG. 3 is a schematic diagram of a circuit for performing functions of attenuators, an adder and an integrator in the two feedback loops of the regulator of FIG. 1.

FIG. 3 illustrates an exemplary circuit for performing the functions of the attenuators 20 and 22, the summing circuit 15 and the integrator 17 without the feedback amplifier 21. Since the function of the summing circuit is to provide $X = A_x x + (A_o e_o - V_{R1})$, and the integrator can be best implemented with an operational amplifier and feedback capacitor in its negative feedback circuit, a current proportional to $A_x x + (A_o e_o - V_{R1})$ is formed at the summing mode of the operational amplifier 23 having a feedback capacitor 24.

The functions of attenuators 20 and 21 are performed in the circuit of FIG. 3 by a voltage dividing network comprised of resistors 25, 26, and 27. It should be noted that the output of the integrator is $-Y$, which is merely the waveform Y of FIG. 2 inverted. In practice, the comparator Y would be implemented to use the inverted signal, $-Y$, in order to use a conventional threshold detector.

Assuming the summing circuit 15 is separate, its output is a pulsed signal X which is positive during the time a power switch is turned on and negative while no power switch is turned on. The feedback control operative through the comparator 18 and pulse generator 16 maintains the area above the reference $V_{R1}$ equal to the area below the reference. Since the width of each pulse out of the generator is fixed, the balance is maintained by varying the time between pulses. To accomplish that, the comparator 18 compares the integrator output signal with a second reference voltage $V_{R2}$. Each time the signal Y reaches the reference level $V_{R2}$, a trigger pulse, P, is generated to trigger the pulse generator 16. The trigger pulse is also applied to the sequencer 19 to cause it to enable the next gate in sequence, thus distributing the pulses from the generator to the power switches to turn the power switches on in sequence.

If the output voltage $e_o$ increases, the signal Y will reach a higher peak, and thus reach the level $V_{R2}$ later. Conversely, if the output voltage $e_o$ drops, the signal Y will reach the level $V_{R2}$ sooner to turn on the next power switch in sequence earlier. The result is regulation of the output voltage to the load in much the same manner as in a single-phase boost regulator with two-loop control. A staggered multi-phase boost regulator has the advantage of distributing the load among a plurality of power switches. By using series connected sense windings $S_1, S_2 \ldots S_N$ in accordance with the present invention, it is possible to stagger the operation of the power switches without requiring separate feedback loops for each power switch.

Figure 4:
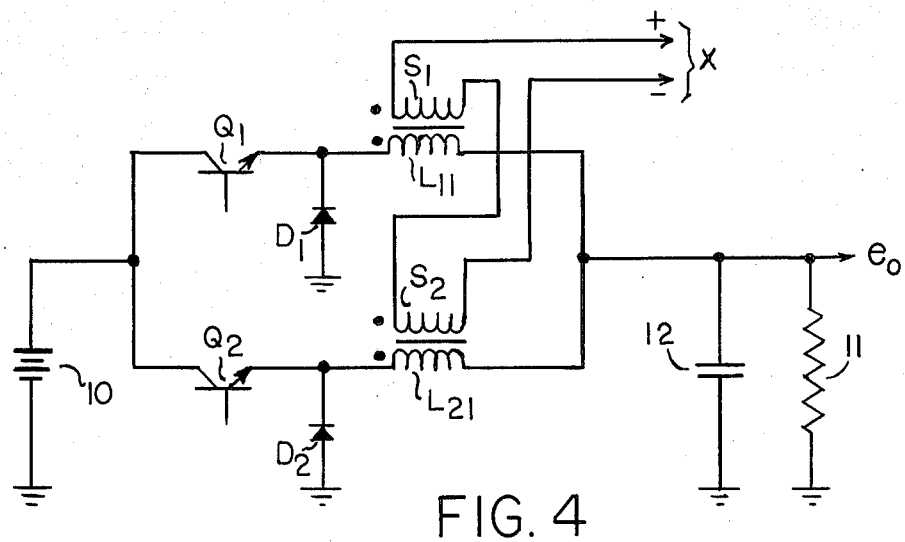
FIG. 4 is a schematic diagram of a buck regulator employing the principles of the present invention.
Figure 5:
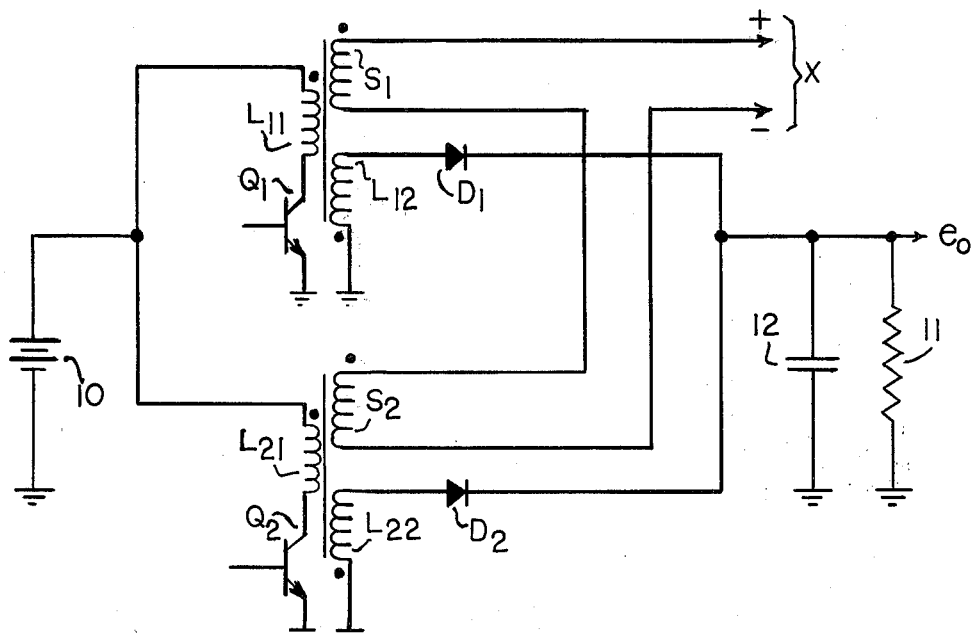
FIG. 5 is a schematic diagram of a buck-boost regulator employing the principles of the present invention.

Application of the present invention is not limited to a boost regulator with two-loop control. It may also be employed to advantage in a buck regulator with two-loop control, where $e_o \leq e_s$, where $e_s$ represents the source voltage, or to a buck-boost regulator with two-loop control, where $e_o \leq e_s$, as shown in FIGS. 4 and 5, respectively. All that is required is a sense winding for coupling power ouptut pulses to the second feedback loop from each power switch, and a series connection of all sense windings to the feedback loop 14 through an attenuator 22.

For simplicity only power switches for two-phase regulators are shown in FIGS. 4 and 5. All other elements of the two-loop feedback control not shown are the same as for the multiphase boost regulator of FIG. 1. Since only the configuration of the power switches is different, the corresponding components in the power switch circuits of FIGS. 4 and 5 are identified by the same reference numerals as in the power switch circuits of FIG. 1.

Referring now to FIG. 4, the power switch transistors $Q_1$ and $Q_2$ couple the power source to the filter and load through inductors $L_{11}$ and $L_{21}$. The sense windings $S_1$ and $S_2$ are wound on the same cores as the buck regulator inductors $L_{11}$ and $L_{21}$ which thus serve as primary windings of transformers having the sense windings as secondary windings.

In the buck-boost regulator of FIG. 5, the primary windings $L_{11}$ and $L_{21}$ of buck-boost regulator transformers are connected to circuit ground by the power switch transistors $Q_1$ and $Q_2$. The secondary windings $L_{12}$ and $L_{22}$ of the buck-boost regulator transformers are connected directly to circuit ground. The series connected sense windings $S_1$ and $S_2$ are wound on the cores of the buck-boost regulator transformers.

Although particular embodiments of the invention have been described aand illustrated herein, it is recognized that modifications and variations may readily occur to those skilled in the art. It is therefore intended that the claims be interpreted to cover such modifications and variations.

What is claimed is:

1. In a boost, buck and buck-boost dc-to-dc converter employing a plurality of parallel staggered-phase power switches with a two-loop feedback control circuit for regulating the voltage of power applied to a load from a source, a separate switched inductive means for coupling said source to said loading during successive phases, a separate sense winding coupled to each inductive means, all of said sense windings being connected in series to one of two feedback loops in said two-loop feedback control circuit to provide a signal that indicates when one of said inductive means is switched on, means responsive to said two-loop feedback control circuit for producing switching pulses to switch on an inductive means during each successive phase, and means for distributing said switching pulses to said inductive means in sequence during successive phases.

2. Apparatus as defined in claim 1 wherein said means for producing said switching pulses comprises means for generating trigger pulses at a rate determined by a feedback signal produced by said two-loop feedback control circuit, means responsive to said trigger pulses for generating said switching pulses, a plurality of gating means coupling said pulse generating means to said inductive means, one gating means for each inductive means, and sequencing means responsive to said trigger pulses for enabling said gating means to transmit said switching pulses to said inductive means in said sequence.

3. Apparatus as defined in claim 2 for a boost regulator wherein each inductive means comprises a transformer having a primary and secondary windings connected in series between said source and said load, a switching transistor having its emitter connected to circuit ground, its base connected to one of said gating means, and its collector connected to a junction between said series connected primary and secondary windings.

4. Apparatus as defined in claim 2 for a buck regulator wherein each inductive means comprises a switching transistor and an inductor, said transistor having its collector-emitter current path connected in series with said inductor and its base connected to one of said gating means.

5. Apparatus as defined in claim 2 for a buck-boost regulator wherein each inductive means comprises a transformer having a primary winding and a secondary winding, and a switching transistor, said transistor having its collector-emitter current path in series with said primary winding of said transformer between said source and circuit ground, and said secondary winding being connected between circuit ground and said load.

6. In a dc-to-dc converter of the boost, buck or buck-boost type for regulating voltage applied to a load from a source, said converter having: a first feedback loop for providing a signal that indicates when a power switch is on to transmit power to the load, a second feedback loop for providing a signal directly proportional to the voltage applied to the load for comparison with a reference to produce an error signal; means for adding the signals of said first and second feedback loops to provide a pulsed feedback signal that switches between positive and negative voltage levels as a power switch is turned on and off; means for integrating said pulsed feedback signal; and means for generating a power switch control pulse each time the output of said integrating means reaches a predetermined minimum level, the improvement comprising a plurality of power switches, each power switch having a switching transistor and an inductor for coupling said source to said load through a low-pass filter, and a sense winding inductively coupled to said inductor, said sense windings of said power switches being connected in series with the same polarity to said first feedback loop, and a gate coupling said pulse generating means to the control electrode of said switching transistor, each gate having a second input terminal, and means for applying an enabling voltage to the second input terminal of a different one of said gates in sequence each time said pulse generating means initiates a power switch control pulse.

7. In a dc-to-dc converter of the boost, buck or buck-boost type for regulating the voltage of power applied to a load from a source, a plurality of power switches connected between said source and said load, each power switch including an inductor through which current flows to the load on a switched basis and a sense winding inductively coupled to the inductor, said snese windings being connected in series with the same polarity to produce a feedback signal indicating the state of said power switches by a pulse each time a switch is on, means for comparing said voltage applied to said load with a reference, means responsive to said comparing means, and said feedback signal for generating trigger pulses at an increased rate when said voltage decreases relative to said reference and at a decreased rate when said voltage increases relative to said reference, means responsive to said trigger pulses for generating switching pulses, one switching pulse for each trigger pulse, a plurality of gating means, one for each power switch, for transmitting switching pulses to said power switches, and means responsive to said trigger pulses for enabling said gating means in sequence, one during each period of said trigger pulses, whereby said power switches are turned on in sequence for fixed periods of time, and low-pass filtering means for smoothing current from said inductors of said power switches delivered to said load at said voltage.

8. Apparatus as defined in claim 7 for a boost regulator wherein each inductive means comprises a transformer having a primary and secondary windings connected in series between said source and said load, a switching transistor having its emitter connected to circuit ground, its base connected to one of said gating means, and its collector connected to a junction between said series connected primary and secondary windings.

9. Apparatus as defined in claim 7 for a buck regulator wherein each inductive means comprises a switching transistor and an inductor, said transistor having its collector-emitter current path connected in series with said inductor and its base connected to one of said gating means.

10. Apparatus as defined in claim 7 for a buck-boost regulator wherein each inductive means comprises a transformer having a primary winding and a secondary winding, and a switching transistor, said transistor having its collector-current path in series with said primary winding of said transformer between said source and circuit ground, and said secondary winding being connected between circuit ground and said load.

* * * * *